United States Patent
Chen

(10) Patent No.: US 9,894,525 B2
(45) Date of Patent: Feb. 13, 2018

(54) ELECTRONIC DEVICE AND METHOD FOR SEARCHING THE SAME

(71) Applicant: Chiun Mai Communication Systems, Inc., New Taipei (TW)

(72) Inventor: Hung-Chin Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 136 days.

(21) Appl. No.: 15/008,763

(22) Filed: Jan. 28, 2016

(65) Prior Publication Data

US 2017/0026928 A1 Jan. 26, 2017

(30) Foreign Application Priority Data

Jul. 20, 2015 (CN) .......................... 2015 1 0429096

(51) Int. Cl.
*H04W 24/00* (2009.01)
*H04W 12/08* (2009.01)
*H04L 29/06* (2006.01)
*H04W 12/06* (2009.01)
*H04M 3/436* (2006.01)
*H04M 3/42* (2006.01)
*H04L 29/08* (2006.01)
*H04W 4/02* (2009.01)

(52) U.S. Cl.
CPC .......... *H04W 12/08* (2013.01); *H04L 63/083* (2013.01); *H04L 63/0876* (2013.01); *H04L 63/107* (2013.01); *H04L 63/108* (2013.01); *H04L 67/22* (2013.01); *H04M 3/42042* (2013.01); *H04M 3/4365* (2013.01); *H04W 4/02* (2013.01); *H04W 12/06* (2013.01)

(58) Field of Classification Search
CPC . H04L 63/083; H04L 63/0876; H04L 63/107; H04L 63/108; H04L 67/22; H04W 12/06; H04W 12/08; H04W 4/02; H04W 4/14; H04M 3/42042; H04M 3/4365
See application file for complete search history.

(56) References Cited

U.S. PATENT DOCUMENTS

2006/0212407 A1* 9/2006 Lyon ...................... G06Q 20/04
705/71
2008/0090592 A1* 4/2008 Tsuchiya ........... H04M 3/42042
455/456.6

* cited by examiner

*Primary Examiner* — Barry Taylor
(74) *Attorney, Agent, or Firm* — ScienBiziP, P.C.

(57) ABSTRACT

A searching method for an electronic device includes presetting a condition for a second electronic device to act as a searching terminal for searching the electronic device. An authentication password is preset at the electronic device. A request for the authentication password is sent to the second electronic device upon determining that the second electronic device meets the condition. Once a password from the second electronic device matches the authentication password, coordinates corresponding to a current location of the electronic device are sent to the second electronic device.

12 Claims, 3 Drawing Sheets

ELECTRONIC DEVICE AND METHOD FOR SEARCHING THE SAME

CROSS-REFERENCE TO RELATED APPLICATIONS

This application claims priority to Chinese Patent Application No. 201510429096.8 filed on Jul. 20, 2015, the contents of which are incorporated by reference herein.

FIELD

The subject matter herein generally relates to managing technology, and particularly to an electronic device and a method for searching the electronic device.

BACKGROUND

Generally, it brings lots of troubles to a user when an electronic device such as a mobile phone of the user is lost. For example, the user cannot access mobile banking. Therefore, a method for looking for the electronic device is needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
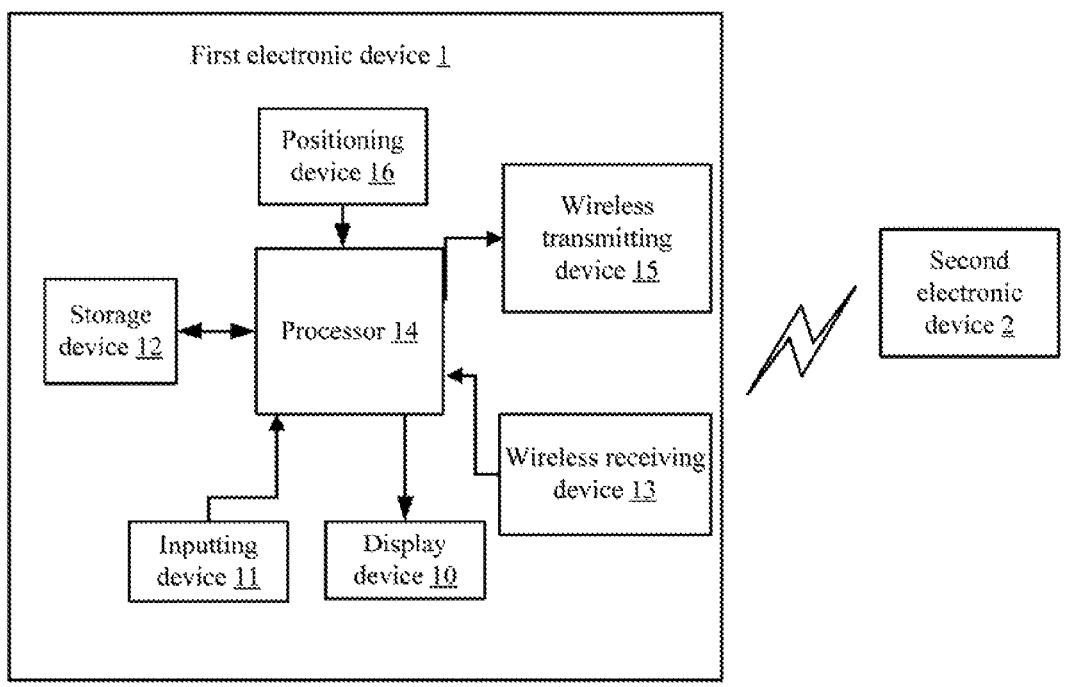
FIG. 1 is a block diagram of one embodiment of a first electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of a first electronic device. Depending on the embodiment, a first electronic device 1 is in communication with a second electronic device 2. In at least one embodiment, the first electronic device 1 and the second electronic device 2 can be smart phones, personal digital assistants (PDAs), tablet computers, or any other suitable electronic devices.

In at least one embodiment, the first electronic device 1 may include, but are not limited to, a display device 10, an inputting device 11, a storage device 12, a wireless receiving device 13, at least one processor 14, a wireless transmitting device 15, and a positioning device 16. The above components are electrically connected to each other. FIG. 1 illustrates only one example of the first electronic device 1 that can include more or fewer components than illustrated, or have a different configuration of the various components in other embodiments.

In at least one embodiment, the first electronic device 1 can preset the second electronic device 2 to be a searching terminal. When the first electronic device 1 is lost, a user of the first electronic device 1 can use the second electronic device 2 to obtain a coordinate corresponding to a current location of the first electronic device 1, and search the first electronic device 1 according to the coordinate corresponding to the current location of the electronic device 1. Details will be provided in the following paragraphs.

In at least one embodiment, the display device 10 can be a touch display or a normal display device that is not configured with a function of touching input. The inputting device 11 can be a keyboard or a touch panel. It should be noted that the inputting device 11 can be the touch panel of the display device 10 when the display device 10 is the touch display.

In at least one embodiment, the display device 10 can provide the user a setting interface for setting a condition for the second electronic device 2 to act as the searching terminal.

In at least one embodiment, the condition includes that an identification code of the second electronic device 2 is the same as a preset identification code, and the first electronic device 1 does not answer calls from the second electronic device 2 for preset times in a preset time period. In at least one embodiment, the identification code of the second electronic device 2 can be a phone number of the second electronic device 2, a media access control (MAC) address of the second electronic device 2, or a combination of the phone number and the MAC address. For example, the condition may include that the identification code of the second electronic device 2 is "13512345678", and the first electronic device 1 does not answer calls from the second electronic device 2 for 3 times in 1 minute.

In other embodiments, the condition includes that the identification code of the second electronic device 2 is the same as the preset identification code, and data information received by a predetermined application of the first electronic device 1 matches preset data information. The data information is received from the predetermined application of the second electronic device 2. In at least one embodiment, the preset identification code can be a user name of the second electronic device 2 for logging into the predetermined application.

In at least one embodiment, the predetermined application can be any communication application such as a short message service (SMS) application or an instant messaging (IM) application. The preset data information can be a preset picture or a preset character string. The preset character string can be comprised of numbers and/or letters. For example, the condition may include that a user name of the second electronic device 2 for logging into an IM application is "13512345678", and the IM application of the first electronic device 1 receives a character string such as "Lost or not?" from the IM application of the second electronic device 2.

In at least one embodiment, the setting interface provided by the display device 10 can further be used to preset an authentication password. When the second electronic device 2 meets the condition and can provide the authentication password, the first electronic device 1 sends the coordinates corresponding to the current location of the first electronic device 1 to the second electronic device 2.

It should be noted that the function of setting the authentication password is to avoid the first electronic device 1 sending the coordinates corresponding to the current location of the first electronic device 1 to the second electronic device 2 in an unintended situation. For example, the unintended situation can be the user of the first electronic device 2 misses calls from the second electronic device 2 for the preset times in the preset time period because the user does not hear call coming reminders.

The storage device 12 can store the condition and the authentication password. In at least one embodiment, the storage device 12 can be an internal storage device, such as a flash memory, a random access memory (RAM) for temporary storage of information, and/or a read-only memory (ROM) for permanent storage of information. The storage device 12 can also be an external storage device, such as a smart media card, a secure digital card, and/or a flash card.

In at least one embodiment, the wireless receiving module 13 can receive calls from other communication devices such as the second electronic device 2. In other embodiments, the wireless receiving module 13 can receive the data information sent from the predetermined application of the second electronic device 2. The wireless receiving module 13 can further forward the data information to the predetermined application of the first electronic device 1. For example, the wireless receiving module 13 can forward a character string that is received from an IM application of the second electronic device 2 to an IM application of the first electronic device 1.

The at least one processor 14 can determine whether the second electronic device 2 meets the condition.

In at least one embodiment, when the identification code of the second electronic device 2 is the same as the preset identification code, and the first electronic device 1 have missed calls from the second electronic device 2 for the preset times in the preset time period, the at least one processor 14 can determine that the second electronic device 2 meets the condition. The at least one processor 14 can trigger the wireless transmitting device 15 to send a request for the authentication password to the second electronic device 2.

For example, when the at least one processor 14 determines that the identification code of the second electronic device 2 is the same as the preset identification code, and the first electronic device 1 have missed calls from the second electronic device 2 for three times in one minute, the at least one processor 14 can determine that the second electronic device 2 meets the condition.

The at least one processor 14 can further trigger the wireless transmitting device 15 to send a request for the authentication password such as "please provide the authentication password" to the second electronic device 2. When the second electronic device 2 receives the request, the second electronic device 2 can send a password to the first electronic device 1.

In other embodiments, when the identification code of the second electronic device 2 is the same as the preset identification code, and the data information received by the predetermined application of the first electronic device 1 matches the preset data information, the at least one processor 14 can determine that the second electronic device 2 meets the condition. The at least one processor 14 can further trigger the wireless transmitting device 15 to send the request.

For example, when a character string received by the IM application of the first electronic device 1, which is sent from the IM application of the second electronic device 1, matches the preset data information, and the user name of the second electronic device 2 for logging into the IM application is the same as the preset identification code, the at least one processor 14 can determine that the second the electronic device 2 meets the condition. The at least one processor 14 can further trigger the IM application of the first electronic device 1 to send the request to the second electronic device 2 through the wireless transmitting device 15. When the second electronic device 2 receives the request, the second electronic device 2 can send a password to the first electronic device 1.

The wireless receiving device 13 can further receive the password sent from the second electronic device 2. The at least one processor 14 can further determine whether the received password matches the preset authentication password that is stored in the storage device 12. When the received password matches the preset authentication password, the at least one processor 14 can trigger the positioning device 16 to obtain the coordinate corresponding to the current location of the first electronic device 1.

In at least one embodiment, the positioning device 16 can be a Global Positioning System (GPS), an Assisted Global Positioning System (AGPS), a BeiDou Navigation Satellite System (BDS), or a Global Navigation Satellite System (GLONASS).

The at least one processor 14 can further trigger the wireless transmitting device 15 to send the coordinates corresponding to the current location of the first electronic device 1 to the second electronic device 2. For the convenience of the user to quickly find back the first electronic device 1, when the second electronic device 2 receives the coordinates corresponding to the current location of the first electronic device 1. The second electronic device 2 can invoke a predetermined electronic map, and indicate the current location of the first electronic device 1 on the predetermined map. In at least one embodiment, the second electronic device 2 can further indicate the coordinates corresponding to the current location of the first electronic device 1 on the predetermined electronic map.

Figure 2:
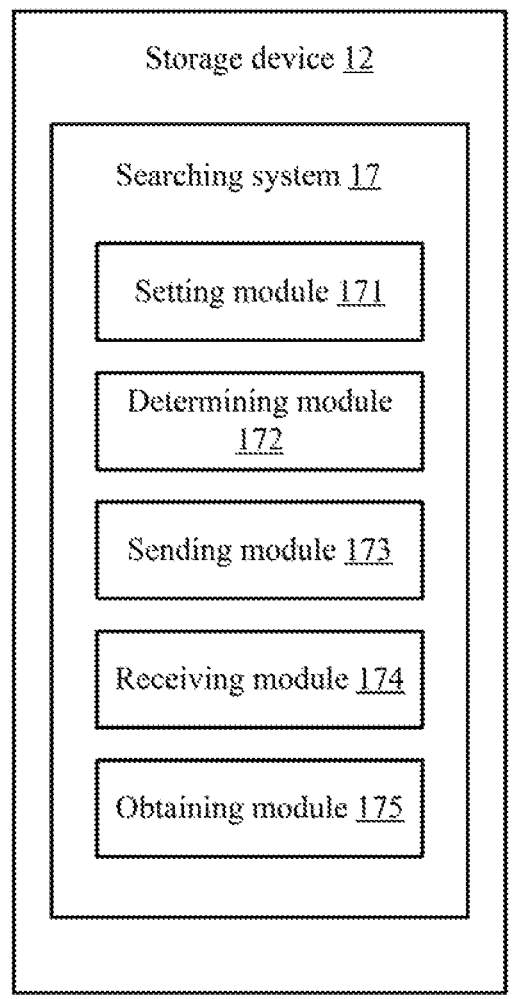
FIG. 2 is a block diagram of one embodiment of functional modules of a searching system installed in the first electronic device of FIG. 1.

FIG. 2 illustrates a block diagram of one embodiment of functional modules of a searching system 17 that is installed in the first electronic device 1. In at least one embodiment, the searching system 17 can include a setting module 171, a determining module 172, a sending module 173, a receiving module 174, and an obtaining module 175. The function modules 171-175 can include computerized codes in the form of one or more programs, which are stored in the storage device 12, and are executed by the at least one processor 14 of the first electronic device 1 to provide functions of searching the first electronic device 1. Details of functions of the modules will be provided in conjunction with a flow chart of FIG. 3 in the following paragraphs.

Figure 3:
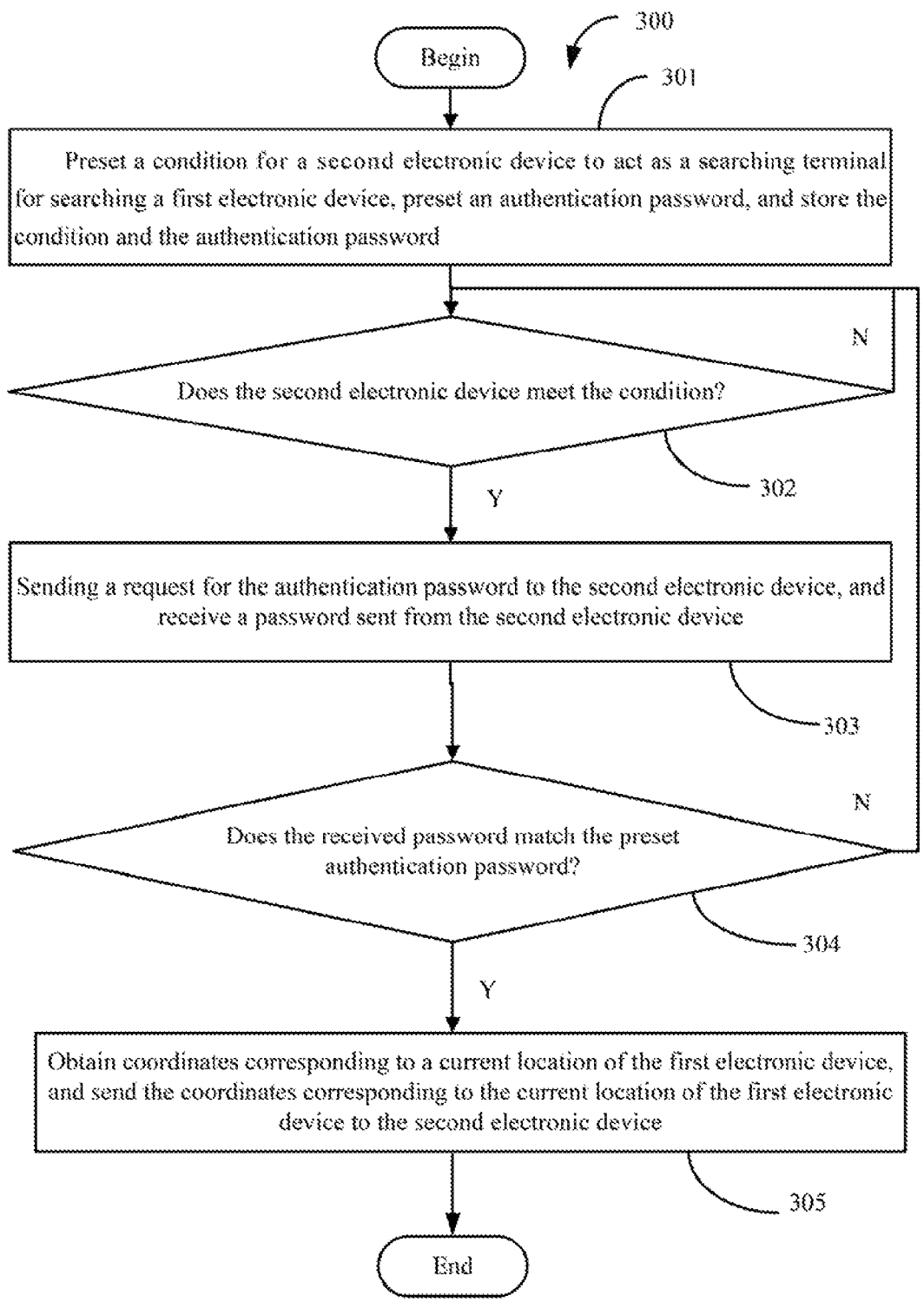
FIG. 3 illustrates a flow chart of one embodiment of a method for searching the first electronic device of FIG. 1 using a second electronic device.

FIG. 3 illustrates a flowchart of one embodiment of searching the first electronic device 1. The example method 300 is provided by way of example, as there are a variety of ways to carry out the method. The method 300 described below can be carried out using the configurations illustrated in FIG. 1 and FIG. 2, for example, and various elements of these figures are referenced in explaining example method 300. Each block shown in FIG. 3 represents one or more processes, methods or subroutines, carried out in the exemplary method 300. Additionally, the illustrated order of blocks is by example only and the order of the blocks can be changed according to the present disclosure. The exemplary method 300 can begin at block 301. Depending on the embodiment, additional steps can be added, others removed, and the ordering of the steps can be changed.

At block 301, the setting module 171 of the first electronic device 1 can preset a condition for the second electronic device 2 to act as the searching terminal for searching the first electronic device 1.

In at least one embodiment, the setting module 171 can provide the user a setting interface for setting the condition on the display device 10.

In at least one embodiment, the condition includes that an identification code of the second electronic device 2 is the same as a preset identification code, and the first electronic device 1 does not answer calls from the second electronic device 2 for preset times in a preset time period. In at least one embodiment, the identification code of the second electronic device 2 can be a phone number of the second electronic device 2, a media access control (MAC) address of the second electronic device 2, or a combination of the phone number and the MAC address. For example, the condition may include that the identification code of the second electronic device 2 is "13512345678", and the first electronic device 1 does not answer calls from the second electronic device 2 for 3 times in 1 minute.

In other embodiment, the condition includes that the identification code of the second electronic device 2 is the same as the preset identification code, and data information received by a predetermined application of the first electronic device 1 matches preset data information. The data information is received from the predetermined application of the second electronic device 2. In at least one embodiment, the preset identification code can be a user name of the second electronic device 2 for logging into the predetermined application.

In at least one embodiment, the predetermined application can be any communication application such as a short message service (SMS) application or an instant messaging (IM) application. The preset data information can be a preset picture or a preset character string. The preset character string can be comprised of numbers and/or letters. For example, the condition may include that a user name of the second electronic device 2 for logging into an IM application is "13512345678", and the IM application of the first electronic device 1 receives a character string such as "Lost or not?" from the IM application of the second electronic device 2.

In at least one embodiment, the setting interface provided by the setting module 171 can further be used to preset an authentication password. When the second electronic device 2 meets the condition and can provide the authentication password, the first electronic device 1 sends the coordinates corresponding to the current location of the first electronic device 1 to the second electronic device 2.

As mentioned above, the function of setting the authentication password is to avoid the first electronic device 1 sending the coordinates corresponding to the current location of the first electronic device 1 to the second electronic device 2 in an unintended situation. For example, the unintended situation can be the user of the first electronic device 2 misses calls from the second electronic device 2 for the preset times in the preset time period because the user does not hear call coming reminders.

The setting module 171 can further store the condition and the authentication password in the storage device 12.

At block 302, the determining module 172 of the first electronic device 1 can determine whether the second electronic device 2 meets the condition. When the second electronic device 2 meets the condition, the process goes to block 303. When the second electronic device 2 does not meet the condition, the determining module 172 can repeat block 302 to continue to determine whether the second electronic device 2 meets the condition.

In at least one embodiment, when the identification code of the second electronic device 2 is the same as the preset identification code, and the first electronic device 1 have missed calls from the second electronic device 2 for the preset times in the preset time period, the determining module 172 can determine that the second electronic device 2 meets the condition. For example, when the identification code of the second electronic device 2 is the same as the preset identification code, and the first electronic device 1 have missed calls from the second electronic device 2 for three times in one minute, the determining module 172 can determine that the second electronic device 2 meets the condition.

In other embodiments, when the identification code of the second electronic device 2 is the same as the preset identification code, and the data information received by the predetermined application of the first electronic device 1 matches the preset data information, the determining module 172 can determine that the second electronic device 2 meets the condition.

For example, when a character string received by an IM application of the first electronic device 1, which is sent from the IM application of the second electronic device 1, matches the preset data information, and the user name of the second electronic device 2 for logging into the IM application is the same as the preset identification code, the determining module 172 can determine that the second the electronic device 2 meets the condition.

At block 303, the sending module 173 of the first electronic device 1 can send a request for the authentication password to the second electronic device 2 via the wireless transmitting device 15 of the first electronic device 1. The receiving module 174 can receive a password from the second electronic device 2 via the wireless receiving device 13.

At block 304, the determining module 172 can determine whether the received password matches the preset authentication password that is stored in the storage device 12.

When the received password matches the preset authentication password, the process goes to block 305. When the received password is not the same as the preset authentication password, the process goes back to block 302.

At block 305, the obtaining module 175 of the first electronic device 1 can obtain the coordinates corresponding to the current location of the first electronic device 1 using the positioning device 16 of the first electronic device 1. The sending module 173 can send the coordinates corresponding to the current location of the first electronic device 1 to the second electronic device 2 via the wireless transmitting device 15.

As mentioned above, for the convenience of the user to quickly find back the first electronic device 1, when the second electronic device 2 receives the coordinates corresponding to the current location of the first electronic device 1. The second electronic device 2 can invoke a predetermined electronic map and indicate the current location of the first electronic device 1 on the predetermined map, according to the coordinates corresponding to the current location of the electronic device 1. In at least one embodiment, the second electronic device 2 can further indicate the coordinates corresponding to the current location of the first electronic device 1 on the predetermined electronic map.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A searching method for an electronic device, the method comprising:
   presetting, at the electronic device, a condition for a second electronic device to act as a searching terminal for searching the electronic device;
   presetting, at the electronic device, an authentication password;
   sending, at the electronic device, a request for the authentication password to the second electronic device, upon determining that the second electronic device meets the condition;
   receiving, at the electronic device, a password from the second electronic device;
   obtaining, at the electronic device, coordinates corresponding to a current location of the electronic device upon determining that the received password matches the authentication password; and
   sending, at the electronic device, the coordinates corresponding to the current location of the electronic device to the second electronic device;
   wherein the condition comprises:
   an identification code of the second electronic device being the same as a preset identification code; and
   the electronic device not answering a call from the second electronic device for a preset number of times in a preset time period.

2. The method according to claim 1, wherein the preset identification code is a user name of the second electronic device for logging into a predetermined application.

3. The method according to claim 1, wherein when the second electronic device receives the coordinates corresponding to the current location of the electronic device, the second electronic device invokes a predetermined electronic map and indicates the current location of the electronic device on the predetermined electronic map, according to the coordinates corresponding to the current location of the electronic device.

4. An electronic device comprising:
   at least one processor;
   a storage device being configured to store one or more programs that, when executed by the at least one processor, cause the at least one processor to:
   preset, at the electronic device, a condition for a second electronic device to act as a searching terminal for searching the electronic device;
   preset, at the electronic device, an authentication password;
   send, at the electronic device, a request for the authentication password to the second electronic device, upon determining that the second electronic device meets the condition;
   receive, at the electronic device, a password from the second electronic device;
   obtain, at the electronic device, coordinates corresponding to a current location of the electronic device upon determining that the received password matches the authentication password; and
   send, at the electronic device, the coordinates corresponding to the current location of the electronic device to the second electronic device;
   wherein the condition comprises:
   an identification code of the second electronic device being the same as a preset identification code; and
   the electronic device not answering a call from the second electronic device for a preset number of times in a preset time period.

5. The electronic device according to claim 4, wherein the preset identification code is a user name of the second electronic device for logging into a predetermined application.

6. The electronic device according to claim 4, wherein when the second electronic device receives the coordinates corresponding to the current location of the electronic device, the second electronic device invokes a predetermined electronic map and indicates the current location of the electronic device on the predetermined electronic map, according to the coordinates corresponding to the current location of the electronic device.

7. A non-transitory storage medium having stored thereon instructions that, when executed by a processor of an electronic device, causes the processor to perform a searching method, wherein the method comprises:
   presetting, at the electronic device, a condition for a second electronic device to act as a searching terminal for searching the electronic device;
   presetting, at the electronic device, an authentication password;
   sending, at the electronic device, a request for the authentication password to the second electronic device, upon determining that the second electronic device meets the condition;
   receiving, at the electronic device, a password from the second electronic device;
   obtaining, at the electronic device, coordinates corresponding to a current location of the electronic device upon determining that the received password matches the authentication password; and sending, at the electronic device, the coordinates corresponding to the current location of the electronic device to the second electronic device;

wherein the condition comprises:

an identification code of the second electronic device being the same as a preset identification code; and the electronic device not answering a call from the second electronic device for a preset number of times in a preset time period.

8. The non-transitory storage medium according to claim 7, wherein the preset identification code is a user name of the second electronic device for logging into a predetermined application.

9. The non-transitory storage medium according to claim 7, wherein when the second electronic device receives the coordinates corresponding to the current location of the electronic device, the second electronic device invokes a predetermined electronic map and indicates the current location of the electronic device on the predetermined electronic map, according to the coordinates corresponding to the current location of the electronic device.

10. A searching method for an electronic device, the method comprising:

presetting, at the electronic device, a condition for a second electronic device to act as a searching terminal for searching the electronic device;

obtaining, at the electronic device, coordinates corresponding to a current location of the electronic device; and sending, at the electronic device, the coordinates corresponding to the current location of the electronic device to the second electronic device when the electronic device meets the condition;

wherein the condition comprises:

an identification code of the second electronic device being the same as a preset identification code; and the electronic device not answering a call from the second electronic device for a preset number of times in a preset time period.

11. The method according to claim 10, wherein the preset identification code is a user name of the second electronic device for logging into a predetermined application.

12. The method according to claim 10, wherein when the second electronic device receives the coordinates corresponding to the current location of the electronic device, the second electronic device invokes a predetermined electronic map and indicates the current location of the electronic device on the predetermined electronic map, according to the coordinates corresponding to the current location of the electronic device.

\* \* \* \* \*